US011860990B2

(12) United States Patent
Lawson

(10) Patent No.: US 11,860,990 B2
(45) Date of Patent: *Jan. 2, 2024

(54) SYSTEMS AND METHODS FOR LINK DEVICE AUTHENTICATION

(71) Applicant: Mark Lawson, Las Vegas, NV (US)

(72) Inventor: Mark Lawson, Las Vegas, NV (US)

(73) Assignee: Mark Lawson, Las Vegas, NV (US)

( * ) Notice: Subject to any disclaimer, the term of this patent is extended or adjusted under 35 U.S.C. 154(b) by 37 days.

This patent is subject to a terminal disclaimer.

(21) Appl. No.: 17/494,960

(22) Filed: Oct. 6, 2021

(65) Prior Publication Data

US 2022/0027451 A1 Jan. 27, 2022

Related U.S. Application Data

(63) Continuation of application No. 17/307,412, filed on May 4, 2021, now Pat. No. 11,188,637.

(60) Provisional application No. 63/045,104, filed on Jun. 28, 2020.

(51) Int. Cl.
*G06F 21/44* (2013.01)
*G06N 20/00* (2019.01)
*G06N 7/01* (2023.01)

(52) U.S. Cl.
CPC ............... *G06F 21/44* (2013.01); *G06N 7/01* (2023.01); *G06N 20/00* (2019.01)

(58) Field of Classification Search
CPC ... G06F 21/44; G06F 2221/2111; G06N 7/01; G06N 20/00
See application file for complete search history.

(56) References Cited

U.S. PATENT DOCUMENTS

| 2006/0276176 | A1* | 12/2006 | Lee | H04W 12/06 713/173 |
| 2016/0173404 | A1* | 6/2016 | Pouyllau | H04L 41/5019 709/226 |
| 2018/0349987 | A1* | 12/2018 | Chen | H04L 67/55 |
| 2020/0128595 | A1* | 4/2020 | Dees | H04W 64/00 |

* cited by examiner

*Primary Examiner* — Beemnet W Dada
(74) *Attorney, Agent, or Firm* — Caldwell Intellectual Property Law

(57) ABSTRACT

A system for link device authentication includes a computing device configured to acquire, from an originating device, an identifier of an endpoint device, obtain an endpoint device authentication code corresponding to the identifier, determine, as a function of the identifier, a location of the endpoint device, identify a plurality of link devices, select, from the plurality of link devices, at least a probabilistically verified link device as a function of the location of the endpoint device, and transmit, to the at least a probabilistically verified link device, the endpoint device authentication code.

20 Claims, 5 Drawing Sheets

SYSTEMS AND METHODS FOR LINK DEVICE AUTHENTICATION

CROSS-REFERENCE TO RELATED APPLICATIONS

This application is a continuation of U.S. patent application Ser. No. 17/307,412, filed May 4, 2021, and titled "SYSTEMS AND METHODS FOR LINK DEVICE AUTHENTICATION", which claims the benefit of priority of U.S. Provisional Patent Application Ser. No. 63/045,104 filed on Jun. 28, 2020 and entitled "GLOBAL ACCESS 24/7," both of which are incorporated by reference herein in its entirety.

FIELD OF THE INVENTION

The present invention generally relates to the field of computer security. In particular, the present invention is directed to systems and methods for link device authentication.

BACKGROUND

Some network communication tasks that involve physical presence of a user at a device may be traditionally authenticated using provided to an endpoint device. However, data interception remains a concern that can hamper reliance on such authentication.

SUMMARY OF THE DISCLOSURE

In an aspect, a system for link device authentication includes a computing device configured to acquire, from an originating device, an identifier of an endpoint device, obtain an endpoint device authentication code corresponding to the identifier, determine, as a function of the identifier, a location of the endpoint device, identify a plurality of link devices, select, from the plurality of link devices, at least a probabilistically verified link device as a function of the location of the endpoint device, and transmit, to the at least a probabilistically verified link device, the endpoint device authentication code.

In another aspect a method of link device authentication includes acquiring, by a computing device and from an originating device, an identifier of an endpoint device, obtaining, by the computing device, an endpoint device authentication code corresponding to the identifier, determining, by the computing device and as a function of the identifier, a location of the endpoint device, identifying, by the computing device, a plurality of link devices, selecting, by the computing device and from the plurality of link devices, at least a probabilistically verified link device as a function of the location of the endpoint device, and providing, by the computing device and to the at least a probabilistically verified link device, the endpoint device authentication code.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
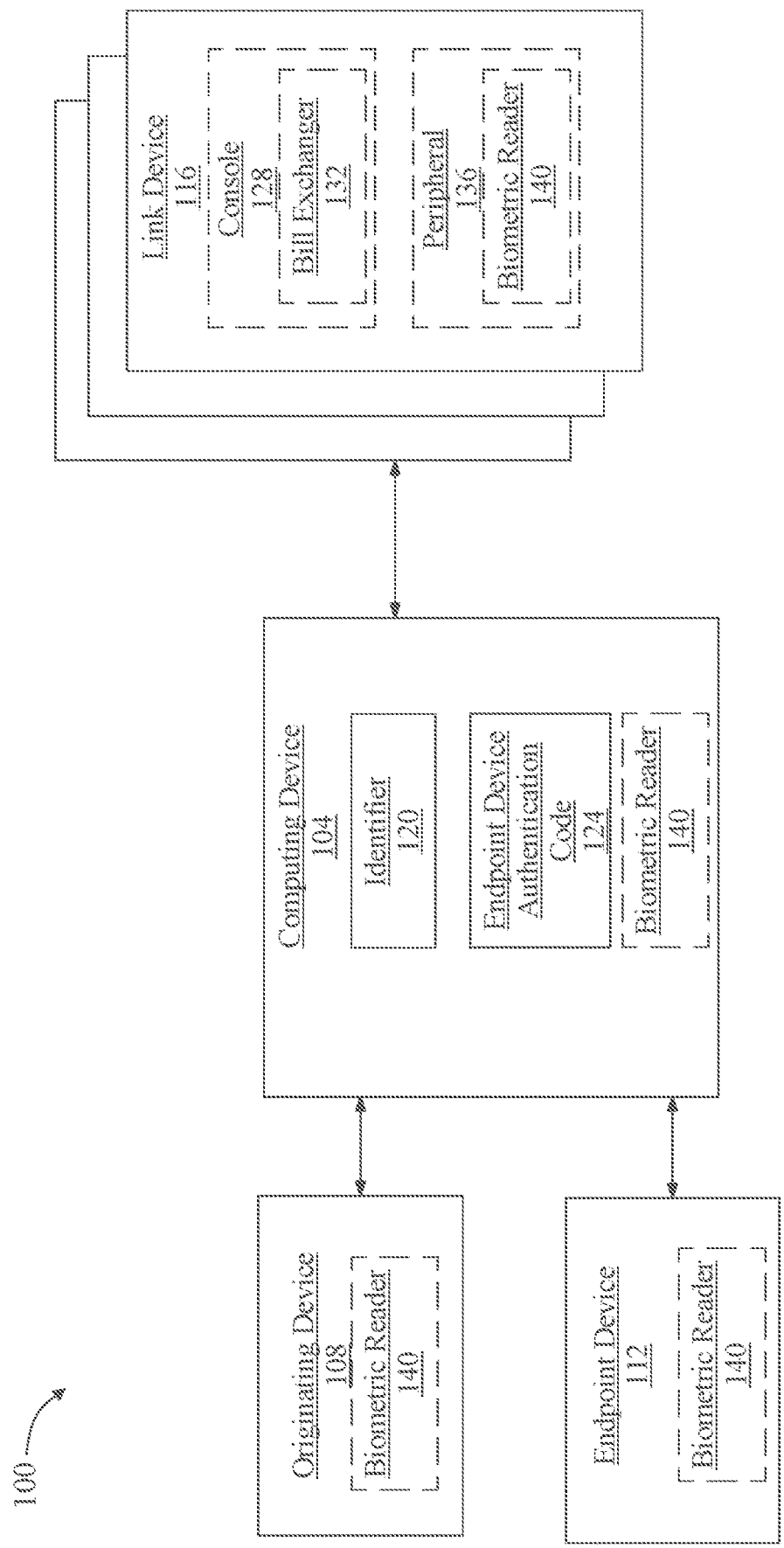
FIG. 1 is a block diagram illustrating an exemplary embodiment of a system for link device authentication.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In embodiments disclosed herein, a link device used for communication with an endpoint device and/or user thereof may be authenticated as a function of a location of the endpoint device. In some embodiments, authentication may depend on a current location and a range of probable future locations as determined according to time and/or additional data concerning endpoint device and/or user thereof.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof.

Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Referring now to FIG. 1, an exemplary embodiment of a system 100 for link device authentication is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing devices operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device 104.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With further reference to FIG. 1, computing device 104 may communicate with at least an originating device 108. Originating device 108 may include any device suitable for use as computing device 104. For instance, and without limitation, originating device 108 may include a mobile device such as a smartphone, cell phone, tablet, or the like, a laptop computer, or a desktop computer, as well as any other computing device 104 of any type described in this disclosure. Computing device 104 may communicate with at least an endpoint device 112, which may be implemented in any manner suitable for implementation of computing device 104 and/or originating device 108. Computing device 104 may communicate with a plurality of link devices 116. Each link device 116 may include any device suitable for use as computing device 104 and/or originating device 108, as described in further detail below. Computing device 104 may communicate with originating device 108, endpoint device 112, and/or link devices 116 using any form of electronic communication including without limitation wired and/or wireless direct or localized communication, local area network (LAN) communication, communication over a wide area network (WAN) such as the Internet, or the like. Computing device 104 may communicate with originating device 108, endpoint device 112, and/or link devices 116 via a text messaging protocol such as the simple messaging service (SMS). Computing device 104 may communicate with originating device 108, endpoint device 112, and/or link devices 116 via a publicly switched telephone network.

Still referring to FIG. 1, computing device 104 may be configured to acquire, from an originating device 108, an identifier 120 of an endpoint device 112. An "identifier," as used in this disclosure, is an element of data that uniquely identifies a computing device 104, where uniqueness may indicate uniqueness within system 100, or statistically determined probable uniqueness such as without limitation uniqueness of a globally unique identifier (GUID) or universally unique identifier (UUID). Identifier 120 may identify endpoint device 112 and/or a user thereof; for instance, identifier 120 may be a "username" of a user of endpoint device 112 or other login credentials.

With continued reference to FIG. 1, computing device 104 is configured to obtain an endpoint device authentication code 124. As used herein, an "authentication code" is an element of data that, when presented to a link device 116 through electronic and/or manual input is accepted as demonstrating an access right of a user of endpoint device 112. An "access right," as used herein, is a right to access an element of data and/or to receive a quantity of a value, where a value may be any item having a financial value; an access right may include a right to receive a specified quantity of currency, which may be dispensed to a user of endpoint device 112 automatedly by link device 116 as described in further detail below, provided to user of endpoint device 112 by a user of link device 116, or the like. Currency may include, without limitation, fiat currency as issued by a governmental body, a virtual currency such as a cryptocurrency, a gift card balance, or the like. In an embodiment, computing device 104 may acquiring endpoint device authentication code 124 from originating device 108, where "acquiring" indicates any form of reception by electronic and/or network communication. For instance, a user of originating device 108 may propose endpoint device authentication code 124, for instance and without limitation by keying it in manually, and/or originating device 108 may automatically generate endpoint device authentication code 124. Alternatively obtaining endpoint device authentication code 124 may include generating the endpoint device authentication code 124. Automatic generation may include generation of any identifier as described above, including without limitation generation of a digital signature as described above. Endpoint device authentication code 124 may have the form of a digital signature, and/or digital signature may sign endpoint device authentication code 124. Generally, endpoint authentication code may have any suitable form, including without limitation a personal identification number (PIN) or other string of textual data.

Still referring to FIG. 1, computing device 104 is further configured to determine a location of the endpoint device 112. Location may include geographical location as identified by a coordinate system such as latitude and longitude and/or any coordinate system used by geographic location devices and/or services. Location may include a location as noted on a map, location in a given polity such as a municipality, county, state, province, or the like, location at or near given network node and/or cell tower of which location may be known, a location as determined by Global Positioning System (GPS) and/or other satellite-based location services, or any other form of location, determined by any means that may occur to a person skilled in the art upon reviewing the entirety of this disclosure. Determining the location of the endpoint device 112 may include acquiring the location from the endpoint device 112; endpoint device 112 may determine its location using any methods, systems, and/or protocols for determining a location as described above.

Alternatively or additionally, and still referring to FIG. 1, computing device 104 may determine location of endpoint device 112 by acquiring communication metadata from the endpoint device 112 and determining the location as a function of the communication metadata. Communication may include, without limitation, a request from endpoint device 112 and/or a user thereof to obtain access rights as described above and/or or endpoint authentication device authentication code, and/or one or more transmissions sent from endpoint device 112 in response to transmissions sent from computing device 104 for the purposes of updating information concerning endpoint device 112 and/or a user thereof. Computing device 104 may receive at least a communication in any suitable form, including without limitation as textual data conveyed via electronic communication. At least a communication may include at least a packet set transmitted over a network; at least a packet set may be transferred over the network according to transfer control protocol/internet protocol (TCP/IP), hyper-text transfer protocol (HTTP), file transfer protocol (FTP), HTTP secure (HTTPS) or the like.

With further reference to FIG. 1, "communication metadata," as used in this disclosure, is data describing and/or enabling transmission of data to be communicated, including without limitation timestamps and/or other envelope and/or header information of transmitted packets, internet protocol (IP) addresses of endpoint device 112, intervening devices such as network nodes through which communication has passed, or the like. Additional metadata may include, without limitation, at least a field. At least a field may include a "settings" parameter such as SETTINGS_HEADER_TABLE_SIZE, SETTINGS_ENABLE_PUSH, SETTINGS_MAX_CONCURRENT_STREAMS, SETTINGS_INITIAL_WINDOW_SIZE, SETTINGS_MAX_FRAME_SIZE, SETTINGS_MAX_HEADER_LIST_SIZE, WINDOW_UPDATE, WINDOW_UPDATE, WINDOW_UPDATE, SETTINGS_INITIAL_WINDOW_SIZE, PRIORITY, and/or similar frames or fields in HTTP/2 or other versions of HTTP or other communication protocols. Additional fields that may be used may include browser settings such as "user-agent" header of browser, "accept-language" header, "session_age" representing a number of seconds from time of creation of session to time of a current transaction or communication, "session_id," "transaction_id," and the like.

Still referring to FIG. 1, determination of a geographical location of communication device from metadata may be accomplished in various ways. For instance, and without limitation, determining a geographic location of endpoint device 112 may include identifying an internet protocol address of endpoint device 112 and determining the geographic location as a function of internet protocol address; this may be accomplished according to IP address geolocation. Alternatively or additionally, determination of geographic location may include determination of proximity to a verified device, where verified device may have a known, recorded, or verified geographic location, and/or of proximity to evaluating device. Proximity may be determined according one or more measures of distance or time between computing device 104 and endpoint device 112, and/or endpoint device 112 and another device such as originating device 108, a network node and/or cell tower. For instance, and without limitation, where one device is connected to another via a network, proximity may be evaluated by measuring distances between the two devices in a graph representing the network; proximity may include, for instance a number of steps through the graph from the once device to another. Steps may also be weighted according to, e.g., estimates of physical distance or length of wire between devices connected by steps, as measured using network latency analysis and/or other processes for instance as described below. Proximity may include geographical location of any devices as described above may alternatively or additionally be determined using navigational facilities, such as the global positioning system (GPS) or other protocols used to determine the location of a device. Distance between devices may be computed using this information. Proximity may include temporal proximity; this may be computed using network latency analysis, time for response to a "ping" signal, or the like. Alternatively or additionally, past response times and/or past times involving communications in the past may be recorded in memory and/or in a temporally sequential listing. In an embodiment, geographic location of endpoint device 112 may be determined as near to or within a certain radius of a device having a known geographic location.

In an embodiment, and with continued reference to FIG. 1, computing device 104 may determine location of endpoint device 112 using a machine-learning method. For instance, and without limitation, computing device 104 may receive training data, as described in further detail below, associating and/or correlating one or more elements of communication metadata and/or location data reported by devices similar to endpoint device 112 with actual locations, as determined by later activity and/or reports by trusted observers or the like. Computing device 104 may train a machine-learning model with such training data. Computing device 104 may input communication metadata and/or location data transmitted by endpoint device 112 to machine-learning model and determine location based on an output of machine-learning model; in other words, computing device 104 may determine location as a function of communication metadata and/or reported location and machine-learning model.

With continued reference to FIG. 1, computing device 104 may determine a location of endpoint device 112 a single time, or may iteratively update the location. For instance, computing device 104 may repeatedly determine a location of endpoint device 112 using any technique and/or combination of techniques described above, and may use updated location to repeat any determination and/or other step using location described in this disclosure.

Still referring to FIG. 1, computing device 104 is configured to identify a plurality of link devices 116. As used in this disclosure, a "link device 116" is a computing device 104 at which endpoint device 112 and/or a user thereof may present endpoint device authentication code 124; link device 116 may be used to dispense currency or other items to a user of endpoint device 112. As a non-limiting example, link device 116 may include a point-of-sale device such as a cash register and/or computing device 104 in communication with a cash register. Link device 116 may include an automatic teller machine (ATM). An ATM may include a processor. An ATM may include a console 128 coupled to the processor. A console 128 may include at least one data output device, at least one data entry device, and/or at least one bill exchanger 132. An ATM may include at least one banking automatic teller device configured to perform banking transactions.

Still referring to FIG. 1, an ATM may include a housing to contain and support the other elements of an ATM. An ATM may contain a vault to securely store and protect elements of an ATM against theft and damage. A vault may be secured with one or more locks. A vault may be reinforced to make it difficult to break the vault open to access its contents. In some embodiments, a vault may contain portions of an ATM machinery that could be used to compromise the function of an ATM, if accessible to a malefactor. In another embodiment, a vault may contain one or more chambers that contain bills; the chambers may include a chamber from which money is dispensed. Chambers may include a depository chamber into which money or checks are deposited by users. An ATM may include one or more sensors (not shown). An ATM may include one or more indicator lights (not shown). An ATM may be an on-premises ATM that is located on bank property, such as a bank branch; the on-premises ATM may function as an extension of the bank branch. An ATM may include an off-premises ATM located at a place other than bank property, such as a convenience store, restaurant, or gas station.

In some embodiments, an ATM may include a processor. A processor may be a processor as described in this disclosure. A processor may communicate with a secure crypto-processor (not shown); the secure crypto-processor may be kept within a secure enclosure such as the vault. In some embodiments, a secure crypto processor may encrypt sensitive information, such as personal and financial information, to prevent theft of the sensitive information. In some embodiments, a crypto processor also generates public and private keys for the public key cryptographic system used for the cryptocurrency itself, as described in further detail below. A processor may communicate with a microcontroller; the microcontroller may be a single-board microcontroller. An example of such a device is an ARDUINO, produced by Arduino, LLC of Cambridge, Massachusetts, which consists of an open-source hardware board designed around an 8-bit Atmel AVR microcontroller, or a 32-bit Atmel ARM. In some embodiments, a microcontroller may make application of interactive objects or environments more accessible. For instance, a single-board microcontroller attached to a universal serial bus (USB) port may allow for a program to be written that is able to distinguish process, organize and command processes based on user-keyed inputs. A processor may include and/or be included in a microcontroller. A processor may communicate with a memory; the memory may be a main memory or secondary memory as described in this disclosure. Memory may include at least one provision-secure digital (SD) card; the SD card may contain data such as pre-created QR codes to be used as set forth in further detail below.

Further referring to FIG. 1, an ATM may include a console 128 coupled to a processor. Console 128 may include at least one data output device. An ATM console 128 may include a display, which may or may not have touchscreen capability.

A display may be any display as described in this disclosure. At least one data output device may include at least one printer. A printer may include a thermal printer and its accompanying components (thermal head, spring, platen, and controller boards); in some embodiments, the thermal printer provides thermal printing capability and can therefore print both traditional ATM receipts and/or QR codes needed for users who wish to use crypto-currency functionality. A printer may include a record printer (to provide the customer with a record of the transaction). A printer may include a receipt chute. At least one data output device may include an audio output; for example, a headphone jack may be a standard item available on many traditional ATM consoles and may be used for those that might need audio prompts and instructions for interfacing with the console 128. By placing headphones into a jack, the user's experience with console 128 may have an audio component.

Still referring to FIG. 1, a console 128 may include at least one data entry device. The at least one data entry device may include one or more data entry keys. For instance, a keypad which is used to provide command functions may flank a display on both its right and left side; a user's keystrokes may determine which functionality he/she wished to utilize. Likewise, the one or more data entry keys may include a number pad that provides the user with the ability to enter unique pin codes, ID codes, and/or endpoint device authentication codes 124. Moreover, a number pad may be used to enter specific dollar or other value amounts. In some embodiments, data entry keys may include a personal identification number (PIN) pad EEP4 (similar in layout to a touch tone or calculator keypad), manufactured as part of a secure enclosure. At least one data entry device may include a touchscreen. At least one data entry device may include a card reader, such as those standard to traditional ATM devices, which may accept a user's debit and/or credit cards in order to help verify the user's identity and access his or her account. A card reader in console 128 may be outfitted to read payment cards, as set forth in further detail below. A card reader may include a magnetic card reader. A card reader may include a chip card reader.

Further referring to FIG. 1, a console 128 may include at least one bill exchanger 132. A bill exchanger 132 may include a bill dispenser. A bill dispenser may dispense fiat currency; for instance, in the United States, a bill dispenser may dispense U.S. dollars in the form or one or more kinds of bills. A bill exchanger 132 may include a bill acceptor. A bill acceptor may accept fiat currency. A bill acceptor may accept checks. A bill acceptor may accept money orders. An ATM may include a second console 128; for instance, a console 128 or dedicated peripheral 136 controller (not shown) may be associated with and/or attached to ATM.

Still referring to FIG. 1, an ATM may include a banking automatic teller device configured to perform banking transactions. A banking automatic teller device may be a hardware device including a processor, a communications infrastructure, and a communications interface for communicating with a processor, as described in this disclosure. A banking automatic teller device may include primary memory or secondary memory as described in this disclosure. In other embodiments, a banking automatic teller device may include a virtual device created by computer programs programming a processor as described in this disclosure. In some embodiments, a banking automatic teller device permits an ATM to perform transactions typically associated with a banking ATM, also known as a traditional ATM. In one embodiment, a banking ATM is a device that allows for financial institutions to service their clients without the need for a human teller. Fiat currency may be withdrawn or deposited into users' bank accounts using traditional ATMs that may be far removed from the physical space of a client's bank per se. A traditional ATM service offering may include depositing currency recognition and acceptance. A traditional ATM service offering may include paying routine bills, fees, and taxes, such as utilities, phone bills, social security, legal fees, and taxes. A traditional ATM service offering may include printing bank statements. A traditional ATM service offering may include updating passbooks. A traditional ATM service offering may include donating to charities. A traditional ATM service offering may include processing checks. A traditional ATM service offering may include paying (in full or partially) the credit balance on a card linked to a specific current account. A traditional ATM service offering may include transferring money between linked accounts (such as transferring between checking and savings accounts).

With continued reference to FIG. 1, an ATM may include one or more peripherals 136. As used in this disclosure, a "peripheral 136" includes one or more hardware components used to enhance the traditional core functions of an ATM. Such enhancements may include but are not limited to videoconferencing with human tellers (known as video tellers), biometrics, where authorization of transactions may be based on or dependent on biometric authentication of a user of endpoint device 112 as described in further detail below, check/cash acceptance, where an ATM accepts and recognizes checks and/or currency without using envelopes, bar code scanning, on-demand printing of "items of value" (such as movie tickets, traveler's checks, etc.), dispensing additional media (such as phone cards), coordination of ATMs with mobile phones, customer-specific advertising, and integration with non-banking equipment. ATM devices and ATM peripherals 136 may be mounted directly to an ATM housing or located externally to the machine. In either instance there may be a wired and/or wireless connection of the peripheral 136 to a processor, for instance via a communications interface as described in this disclosure.

Alternatively or additionally, and still referring to FIG. 1, a peripheral 136 may include a virtual peripheral 136, defined for the purposes of this disclosure as a logical abstraction of one or more hardware components that may be controlled by a combination of already installed peripheral 136 processes and/or already installed traditional ATM processes. A virtual peripheral 136 may include one or more computer programs as described in this disclosure. In some embodiments a logic device such as a central processor and/or master controller on an ATM may be used to activate virtual peripheral 136 processes. A logic device, such as a master controller on an ATM, may simultaneously activate a plurality of virtual peripherals 136. Therefore, an ATM may be shared by a plurality of active virtual peripherals 136 and additional logic may be provided to resolve conflicts that arise when two or more virtual peripherals 136 desire to control the same device at the same time. An ATM may also provide security to ensure the integrity of the split transaction structure, as set forth in further detail below.

Continuing to refer to FIG. 1, an ATM may include and/or be connected to a hardware or software peripheral 136 configured to receive an endpoint device authentication code 124, authenticate an endpoint device 112 as a function of an endpoint device authentication code 124, authenticate an endpoint device 112 and/or user as a function of biometric data and/or login credentials, dispense or cause ATM to dispense currency, cash, or other items of value to a user of endpoint device 112, print or cause ATM to print a receipt and/or printout, or the like. Alternatively or additionally, an ATM and/or processor operating thereon may be configured to receive an endpoint device authentication code 124, authenticate an endpoint device 112 as a function of an endpoint device authentication code 124, authenticate an endpoint device 112 and/or user as a function of biometric data and/or login credentials, dispense or cause ATM to dispense currency, cash, or other items of value to a user of endpoint device 112, print or cause ATM to print a receipt and/or printout, or the like.

Still referring to FIG. 1, an ATM may include an operating system used to implement software, and control the hardware devices, of an ATM. An operating system may be one of a number of commercially available operating systems, including but not limited to MICROSOFT WINDOWS, produced by Microsoft Corporation of Redmond, Washington, a Unix-based operating system such as Linux, or operating systems produced by Apple, Inc., of Cupertino, California. In one embodiment, CEN/XFS or XFS (eXtensions for Financial Services) provides client-server architecture for financial applications on the Microsoft Windows platform or Windows Embedded software, especially peripheral 136 devices such as those used for ATMs, which are unique to the financial industry. In some embodiments, an operating system may include a real-time operating system (RTOS). An RTOS is an operating system intended to serve real-time application requests. In the present description, an RTOS may be able to process data as it comes in, typically without buffering delays. Processing time requirements (including any operating system delay) for an RTOS may be measured in tenths or seconds or less. Different operating systems may use different definitions of processes. In some varieties, for example, processes may be protected. With other operating systems, a process may include dedicated logic that is programmed for differentiated execution.

In some embodiments, and with further reference to FIG. 1, an ATM may include communication protocols, common application layer protocol, anti-money laundering software, ID verification software and standardized crypto-currency software. An operating system may also maintain a directory structure and schedule the processes for execution. During the user of an ATM, the operating system and/or RTOS may load or unload processes from an NV-RAM in a dynamic manner. Communication protocols may include but are not limited to a wireless application protocol and a protocol converter. Wireless application protocol may be incorporated in standard mobile banking applications available for computing devices 104, including applications for mobile devices such as smartphones. In other embodiments, services offered by an ATM may also be accessed via wireless application protocol on all phones with general packet radio service connection.

Still referring to FIG. 1, an ATM may include a protocol converter. In one embodiment, a "protocol converter" is a device used to convert standard or proprietary protocol of one device to the protocol suitable for the other device or tools to achieve the interoperability. Protocols may be software installed on routers, which convert the data formats, data rate and protocol of one network into the protocols of the network in which data is navigating. Such software may be used to alert other users online or via smartphone application of the presence of a user who may be utilizing an ATM at a particular time and place. A protocol converter may enable tracking protocols, which allow for information to be sent over a wide area progressive network and tracking protocols may be used to send information over area network.

In various embodiments, and continuing to refer to FIG. 1, an ATM may use device drivers to control various component devices. An ATM may include one or more USB ports, which may be used to attach necessary ATM hardware or provide outlets for additional ATM peripherals 136. USB may also be used to tether an ATM to a user's mobile smartphone. An ATM may include components and drivers for Internet Protocol (IP) communications, for relaying datagrams across network boundaries. As noted above, an ATM may include a secure crypto-processor and a driver therefor; the secure crypto-processor may include a dedicated computer on a chip or microprocessor for carrying out cryptographic operations, embedded in a packaging with multiple physical security measures, which give it a degree of tamper resistance. An ATM may include an Ethernet connection that may connect an ATM serially to a computing device 104, which may connect to a user's bank account via a network such as without limitation the Internet. An ATM may include a wireless modem to transmit highly secured data with the latest secure sockets layer SSL encryption standards. An ATM may include payment Card Industry Data Security Standard (PCI) software, such as that standard in current ATMs operation in the field, which provides a security standard for organizations that handle cardholder information for the major debit, credit, prepaid, e-purse, ATM, and POS cards.

Still referring to FIG. 1, a hardware security module may also be part of an ATM that operates inside a locked safe to deter theft, substitution, and tampering. An ATM may contain further security measures to prevent other devices incorporated in an ATM, such peripherals 136 as described above, from accessing the banking functions associated with a banking automatic teller device. For instance, there may be a firewall and barrier between access to traditional remote financial services commonly associated with ATM use and the added aforementioned peripherals 136. A firewall may be a hardware firewall, for instance, the firewall may include one or more hardware devices at the interface between a component device and a communications infrastructure. A firewall may be a virtual firewall, including one or more computer programs that control access to processes and components according to a security protocol. A firewall may combine elements of a hardware firewall and a virtual firewall.

With continued reference to FIG. 1, computing device 104 is configured to select at least a probabilistically verified link device 116 from the plurality of link devices 116 as a function of the location of the endpoint device 112. A "probabilistically verified link device," as used in this disclosure is a device at which is it is probable that a user of endpoint device 112 is likely to be located at a given moment in time, based on one or more measures of likelihood/probability. Whether a device is a probabilistically verified link device 116 may be iteratively or continually redetermined based on one or more changes to data, such as without limitation updates or changes in a location of endpoint device 112. For instance, where endpoint device 112 has moved some distance in a given direction, some link devices 116 may cease to be probabilistically verified, because they may be too far away.

In an embodiment, and further referring to FIG. 1, selecting at least a probabilistically verified link device 116 may include determining a distance from location of endpoint device 112 to a location of the at least a probabilistically verified link device 116, and selecting the at least a probabilistically verified link device 116 as a function of the distance. Distance may be recalculated as a location of endpoint device 112 changes. Alternatively or additionally, selecting at least a probabilistically verified link device 116 may include determining a temporal datum and selecting the at least a probabilistically verified link device 116 as a function of the temporal datum. For instance, temporal datum may include a time limit within which a user of endpoint device 112 must present endpoint device authentication code 124 to recover a currency amount to be transferred to the user, and probabilistically verified devices may include devices at which the user is likely to be able to arrive, based on distances and/or estimated travel times to locations thereof from user location, based on, for instance, estimated travel times as calculated using map or GPS programs. Estimated travel times may be determined based on past user travel data, data describing transportation options available to the user, or the like; these may alternatively be factors explicitly or implicitly determined and/or estimated using machine learning as described below. Alternatively or additionally, determination may be made at a time when a person presents endpoint device authentication code 124 at a link device 116: where elapsed time since last recorded location of endpoint device 112 is sufficient time for it to be probable that user may have traveled to the link device 116, computing device 104 may determine that link device 116 is probabilistically verified; computing device 104 may further verify a current location of endpoint device 112 at that time as an additional measure. Where endpoint device 112 is located away from link device 116, computing device 104 may, in some embodiments determine that link device 116 is not probabilistically verified. In an embodiment, where computing device 104 determines that link device 116 is not probabilistically verified, computing device 104 may request an additional authentication of user and/or endpoint device 112, for instance using login credentials, biometric data, or the like.

Continuing to refer to FIG. 1, computing device 104 may select at least a probabilistically verified link device 116 using the output of one or more machine-learning processes. For instance, computing device 104 may training a machine-learning model as a function of training data that groups sets of endpoint device 112 data and/or link device 116 data with verified communications; in other words, training data may sets of endpoint device 112 data and/or link device 116 data with verified communications, where "verified communications" are defined as successful presentations of endpoint device authentication codes 124, and/or withdrawals thereafter of money to be transferred or the like, by intended recipients thereof. Machine-learning model may receive endpoint device 112 and/or link device 116 data as inputs and output a probability determination and/or probability distribution for link device 116 and/or endpoint device 112 as described below, and/or a determination that link device 116 is, or is not, probabilistically verified. "Endpoint device 112 data" may include any data concerning endpoint device 112 that computing device 104 may receive, including without limitation any communication data, communication metadata, location, or the like as described above; data may also include previously recorded locations, previous activities by endpoint device 112 and/or user thereof including without limitation past iterations of any method and/or method steps described in this disclosure, or the like. Computing device 104 may acquire current endpoint device 112 data in any manner that may occur to persons skilled in the art upon reviewing the entirety of this disclosure. Computing device 104 may acquire current link device 116 data, defined as data concerning a link device 116 currently under consideration, in any manner that may occur to persons skilled in the art upon reviewing the entirety of this disclosure, including without limitation by maintaining in memory a registry and/or database recording link device 116 data, receiving recent communications and/or communication metadata from link device 116, or the like. Computing device 104 may select at least a probabilistically verified link device 116 as a function of the machine-learning model and current endpoint device 112 data and/or current link device 116 data either or both of which may be input to machine-learning model.

Further referring to FIG. 1, determination, identification, and/or selection of probabilistically verified link devices 116 may be based on a probabilistic matching or "fuzzy matching" process as described in further detail below. For instance, one or more elements of data and/or variables to be compared in making determination, identification, and/or selection of probabilistically verified link devices 116 may be represented as a "fuzzy set" or probability distribution. As a non-limiting example, any of an area which user could reach in a given time, a current location of endpoint device 112, and/or an area from which a given link device 116 may probably be reached in a given amount of time, may be represented by a first fuzzy set or probability distribution; these may be compared to each other via a fuzzy matching process as described below. For instance, a fuzzy set indicative of an area from which a given link device 116 may probably be reached in a given amount of time may be compared to a user location probability distribution.

Still referring to FIG. 1, computing device 104 is configured to provide endpoint device authentication code 124 to the at least a probabilistically verified link device 116. Provision may include, without limitation, electronic transmission using any suitable form of electronic transmission that may occur to a person skilled in the art upon reviewing the entirety of this disclosure. Transmission may include encrypted transmission, transmission secured by a secure sockets layer (SSL) protocol, hypertext transfer protocol-secure (HTTPS), or the like. Provision may include provision of a cryptographic hash of endpoint device authentication code 124, a digital signature signed using endpoint device authentication code 124 as a secret on which a secure proof is made, and/or the endpoint device authentication code 124 accompanied digitally signed by computing device 104. Computing device 104 may provide endpoint device authentication code 124 to endpoint device 112 according to any of the above processes. Computing device 104 may provide, to endpoint device 112 and/or probabilistically verified link device 116 one or more elements of data such as an expiration time for a transaction to be completed, a quantity to be transferred, an identity and/or biometric signature and/or datum of a user of endpoint device 112, or the like. Computing device 104 may performed and/or cause to be transmitted a wire transfer, debit or credit card payment, electronic check, a withdrawal and/or transfer from a bank account, or the like of any amount to be provided from an originating device 108 user to an endpoint device 112 user, and/or any fees attendant to transfer and/or any step of method, to an institution, entity, and/or person associated with link device 116.

In an embodiment, and with continued reference to FIG. 1, endpoint device 112 and/or a user thereof may present endpoint device authentication code 124 to a probabilistically verified link device 116 of at least a probabilistically verified link device 116. Probabilistically verified link device 116 may authenticate endpoint device 112 and/or user thereof using endpoint device authentication code 124, either solely or in combination with one or more additional methods of authentication as described below. Alternatively or additionally, link device 116 may transmit information including endpoint device authentication code 124 and/or any other information usable for authentication to computing device 104, which may verify such information and authenticate endpoint device 112 and/or a user thereof. Where hashes and/or digital signatures have been transmitted, link device 116 and/or computing device 104 may evaluate such hashes and/or digital signatures, and/or compare them to other hashes and/or digital signatures; for instance, endpoint device 112 may hash endpoint device authentication code 124 and provide the hash to link device 116 and/or computing device 104, which may compare the two for authentication purposes. In an alternative embodiment, computing device 104 may not transmit endpoint device authentication code 124 to link device 116, and instead may receive endpoint device authentication code 124 therefrom upon receipt by link device 116 of endpoint device authentication code 124 from endpoint device 112. Link device 116 may be configured to dispense currency or other item of value as authorized by endpoint device authentication code 124, upon authentication of endpoint device 112 and/or user; link device 116 may alternatively or additionally inform an operator thereof, such as a teller or cashier, that disbursement is authorized.

Still referring to FIG. 1, any device in and/or communicating with system 100 may authenticate any other such device and/or any user thereof. For instance, and without limitation, computing device 104 may authenticate link device 116, originating device 108, and/or endpoint device 112. Endpoint device 112 may authenticate computing device 104, link device 116, and/or originating device 108, originating device 108 may authenticate link device 116, computing device 104, and/or endpoint device 112. Link device 116 may authenticate computing device 104, endpoint device 112, and/or originating device 108. Authentication may include verification of login credentials, digital signatures, or the like as described above. Authentication may include authentication of a user of any respective device.

Further referring to FIG. 1, authentication may include biometric authentication. Any of link device 116, computing device 104, originating device 108, and/or endpoint device 112 may include a biometric reader 140. Biometric reader 140 may receive and/or capture biometric data, which may be referred to herein interchangeably as "biometrics," by detecting, measuring, or otherwise capturing one or more physiological, behavioral, or biological patterns, qualities, or characteristics identifying a particular person; identification may be unique, or may be effectively unique by, for instance, being highly improbable to be replicated by capturing biometrics of a different person. Physiological qualities may refer to something that a user is, while behavioral qualities may refer to something that a user can do. Biometric reader 140 may be incorporated in originating device 108, endpoint device 112, computing device 104, and/or link device 116. Biometric reader 140 may function as and/or include a module or component of originating device 108, endpoint device 112, computing device 104, and/or link device 116. Alternatively or additionally, biometric reader 140 may include a device connected to or in communication with originating device 108, endpoint device 112, computing device 104, and/or link device 116, such as peripheral 136 device connected or paired to originating device 108, endpoint device 112, computing device 104, and/or link device 116 via a wired or wireless connection, a device connected to originating device 108, endpoint device 112, computing device 104, and/or link device 116 via a wired or wireless connection, or the like. Biometric reader 140 may include one or more components of hardware/and/or software program code for receiving and/or obtaining a biometric signature of a user. Biometric signature may be generated from biometrics using a biometric sensor scanning a bodily feature of a user. Biometric sensor may include a scanner or reader or other input mechanism that may scan, read, analyze, or otherwise obtain a biometric signature produced from a bodily feature of a user. Biometric scanner may have a transmitter for transmitting scanned biometric data and/or biometric signature to originating device 108, endpoint device 112, computing device 104, and/or link device 116. Bodily feature may include a face, a finger, a thumb, an eye, an iris, a retina, a blood composition, a skin or tissue, and the like. Biometric sensor may include an optical scanner which may rely on capturing an optical scanner which may rely on capturing an optical image such as a photograph to capture a bodily feature of a user. Biometric sensor may include capacitive scanners which may use capacitor circuits to capture a bodily feature of a user. A capacitive scanner may include an array of capacitive proximity sensors connected to a processor and electronic signal processing circuits to detect a bodily feature of a user. Ultrasonic scanners may use high-frequency sound waves to detect a bodily feature of a user. Ultrasonic scanners may include an ultrasonic transmitter and receiver. In an embodiment, an ultrasonic pulse may be transmitted over whenever stress is applied so that some of the pulse is absorbed and some is reflected back to a sensor that may detect stress. Intensity of returning ultrasonic pulse at different points on the scanner may result in capturing a bodily feature of a user. In an embodiment, biometric signature of the user may be used to decrypt an encrypted private key, encrypted data record, digital signature, or other cryptographically secured or generated datum associated with the user.

With continued reference to FIG. 1, biometric data and/or biometric keys may include and/or be generated from behavioral biometrics. Behavioral biometrics may include, without limitation, one or more elements of data describing person-specific patterns of movement, action, response time, or the like. As a non-limiting example, behavioral biometric data may include keystroke dynamics, which may be used to authenticate a person's identity wholly or in part from their typing behavior; for instance, a person may type with a cadence, rhythmical pattern, or the like that is unique to that person, and can be used to differentiate that person from most or all other people. Keystroke dynamics may be recorded using a manual data entry device such as a keyboard, keypad, touchscreen or the like that a person to be authenticated is using for data entry, and/or by a device, which receives data either directly or remotely from a manual data entry device; keystroke dynamics may be recorded from a person that is not aware that the keystroke dynamics are being recorded, for instance upon asking the person to enter other data to be used in validation or authentication. A further non-limiting example of behavioral biometric data may include data generated by recording or analysis of a person's gait, such as without limitation a walking gait; gait data may be recorded by a motion sensor attached to or recording the movement of the person in question. Motion sensor may include optical motion sensors, cameras, accelerometers, gyroscopes, magnetic field sensors, inertial measurement units, or the like. Gait biometrics may be recorded with or without the knowledge of the subject to be authenticated. Persons skilled in the art, upon reviewing the entirety of this disclosure, will be aware of various forms of physiological, behavioral, and/or other biometrics that may be recorded and/or used to generate biometric keys consistently with this disclosure.

Continuing to refer to FIG. 1, characteristics may be extracted from the biometric sample that may be specific to user, which may then be filtered and used to generate a unique biometric key. After a unique biometric key has been generated, a hash corresponding to the unique biometric key may be calculated and stored for later authentication purposes. For example, a biometric sensor scanning a fingerprint of a user may use capacitance scanning to detect features such as arches, whorls, loops, edges, minutiae, and furrows of the user's fingerprint. Once captured, captured bodily feature of a user may be analyzed to look for distinctive and unique attributes which can be used to generate a unique biometric key associated with a user. In yet another nonlimiting example, a biometric sensor scanning an iris may capture more than 250 distinguishing characteristics of a user's iris. Once captured, an iris scan may be analyzed to detect unique patterns of the outer radius of iris patterns and pupils characteristic of a specific user. Unique characteristics that may be detected may then be used to generate a key. In an embodiment, biometric sensor may be unimodal, whereby it scans a single bodily feature of a user. In an embodiment, biometric sensor may be multimodal, whereby it scans two or more bodily features of a user. For example, a multimodal biometric sensor may scan a fingerprint and an iris of a user. A multimodal biometric sensor may employ one sensor to scan two or more bodily features of a user or a multimodal biometric sensor may employ two or more sensors to scan two or more bodily features of a user.

Figure 2:
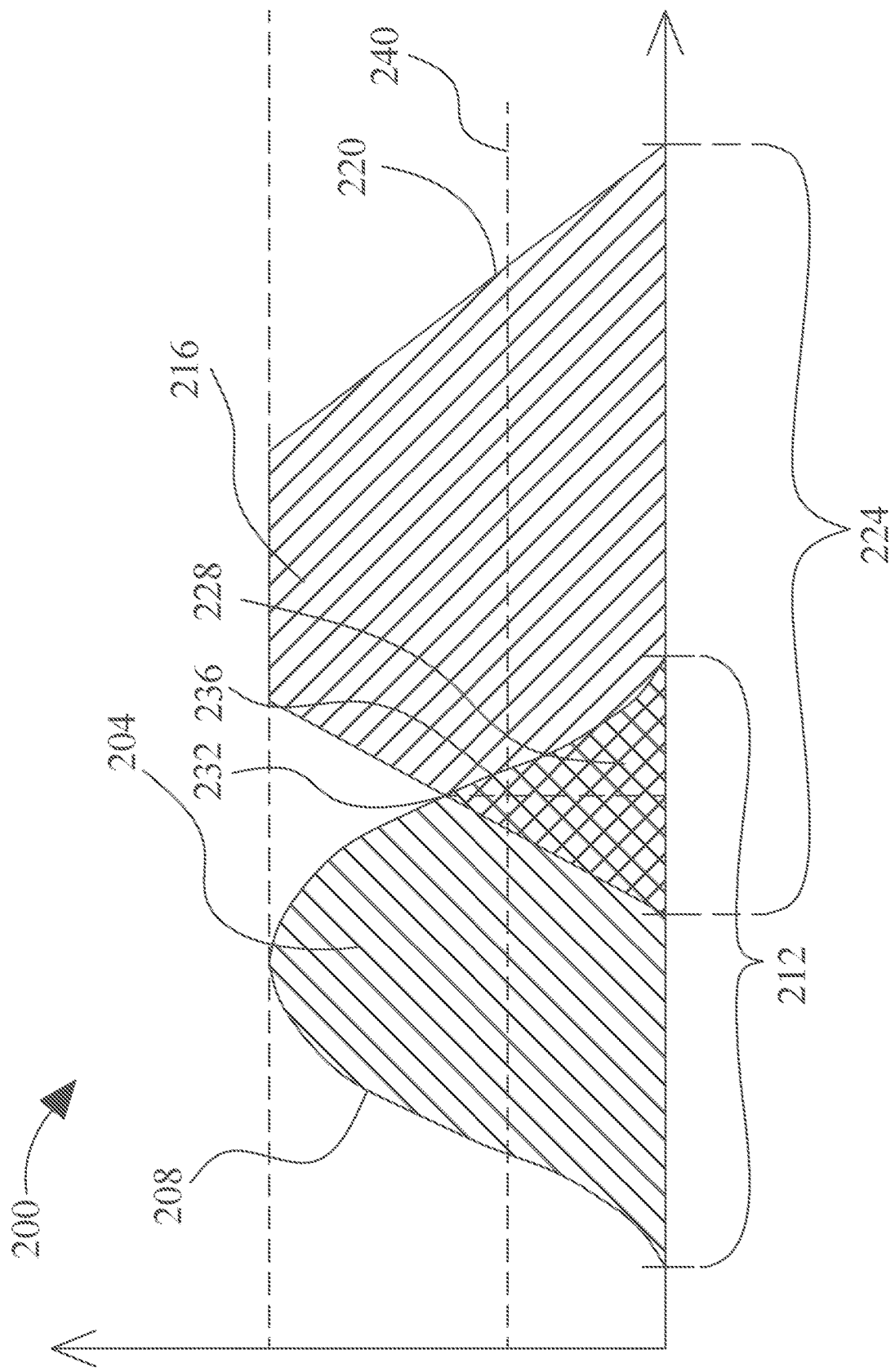
FIG. 2 is a schematic diagram illustrating an exemplary embodiment of fuzzy matching protocols.

Referring now to FIG. 2, an exemplary embodiment of fuzzy set comparison 200 is illustrated. A first fuzzy set 204 may be represented, without limitation, according to a first membership function 208 representing a probability that an input falling on a first range of values 212 is a member of the first fuzzy set 204, where the first membership function 208 has values on a range of probabilities such as without limitation the interval [0,1], and an area beneath the first membership function 208 may represent a set of values within first fuzzy set 204. Although first range of values 212 is illustrated for clarity in this exemplary depiction as a range on a single number line or axis, first range of values 212 may be defined on two or more dimensions, representing, for instance, a Cartesian product between a plurality of ranges, curves, axes, spaces, dimensions, or the like. First membership function 208 may include any suitable function mapping first range 212 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 204 may represent any value or combination of values as described above. A second fuzzy set 216, which may represent any value which may be represented by first fuzzy set 204, may be defined by a second membership function 220 on a second range 224; second range 224 may be identical and/or overlap with first range 212 and/or may be combined with first range via Cartesian product or the like to generate a mapping permitting evaluation overlap of first fuzzy set 204 and second fuzzy set 216. Where first fuzzy set 204 and second fuzzy set 216 have a region 228 that overlaps, first membership function 208 and second membership function 220 may intersect at a point 232 representing a probability, as defined on probability interval, of a match between first fuzzy set 204 and second fuzzy set 216. Alternatively or additionally, a single value of first and/or second fuzzy set may be located at a locus 236 on first range 212 and/or second range 224, where a probability of membership may be taken by evaluation of first membership function 208 and/or second membership function 220 at that range point. A probability at 228 and/or 232 may be compared to a threshold 240 to determine whether a positive match is indicated. Threshold 240 may, in a non-limiting example, represent a degree of match between first fuzzy set 204 and second fuzzy set 216, and/or single values therein with each other or with either set, which is sufficient for purposes of the matching process; for instance, threshold may indicate a sufficient degree of overlap between merit quantitative field 120 and output quantitative field 148 for combination to occur as described above. There may be multiple thresholds; for instance, a second threshold may indicate a sufficient match for purposes of a direct-match subset 156 as described in this disclosure. Each threshold may be established by one or more user inputs. Alternatively or additionally, each threshold may be tuned by a machine-learning and/or statistical process, for instance and without limitation as described in further detail below.

Figure 3:
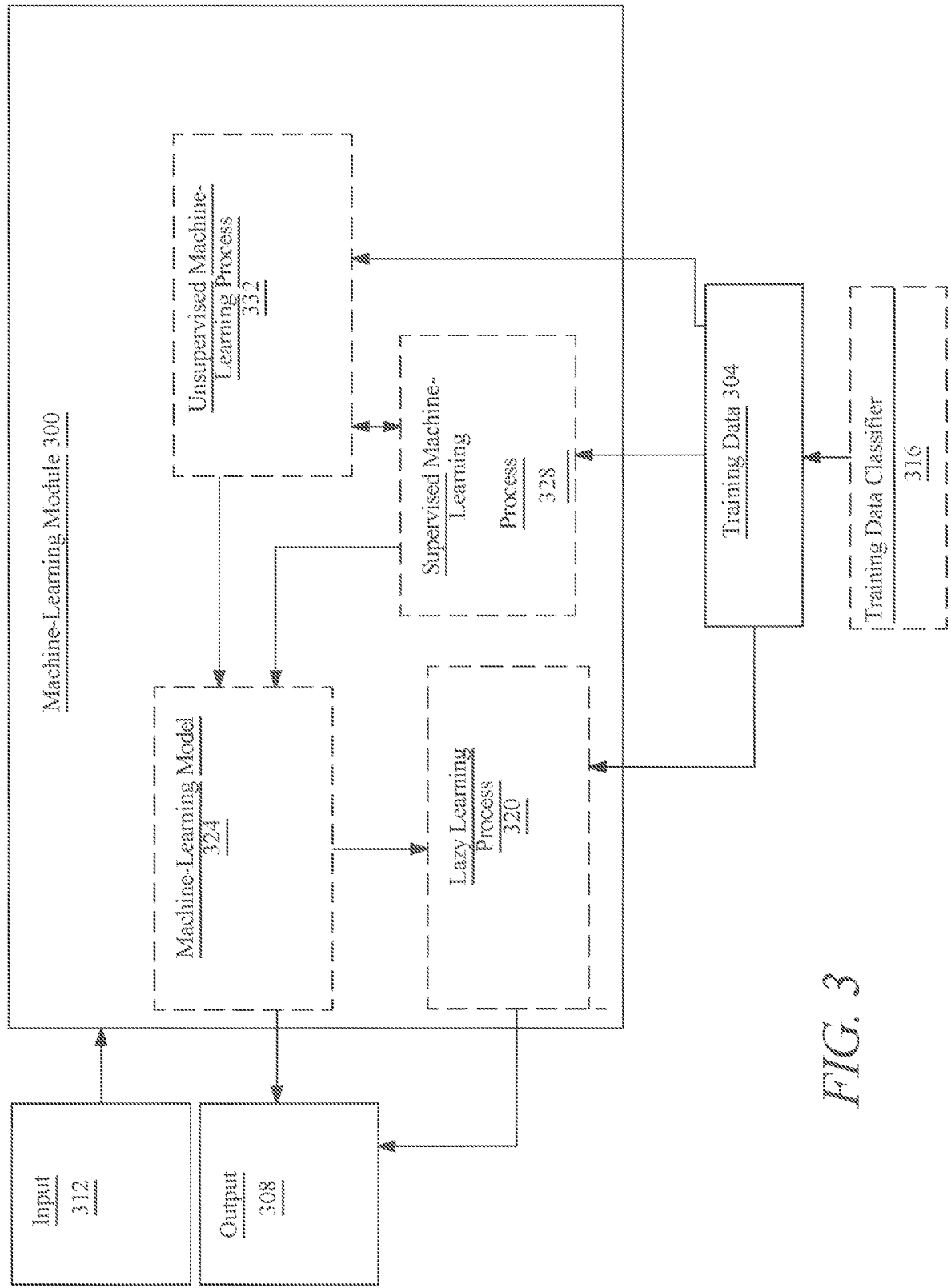
FIG. 3 is a block diagram illustrating an exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device 104/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device 104 and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to a time of day, a type of location such as an urban, rural, and/or suburban location, weather conditions, demographics of user such as age, sex, ethnicity, national origin, or the like, one or more elements of data describing user income, assets, past activity, or the like.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
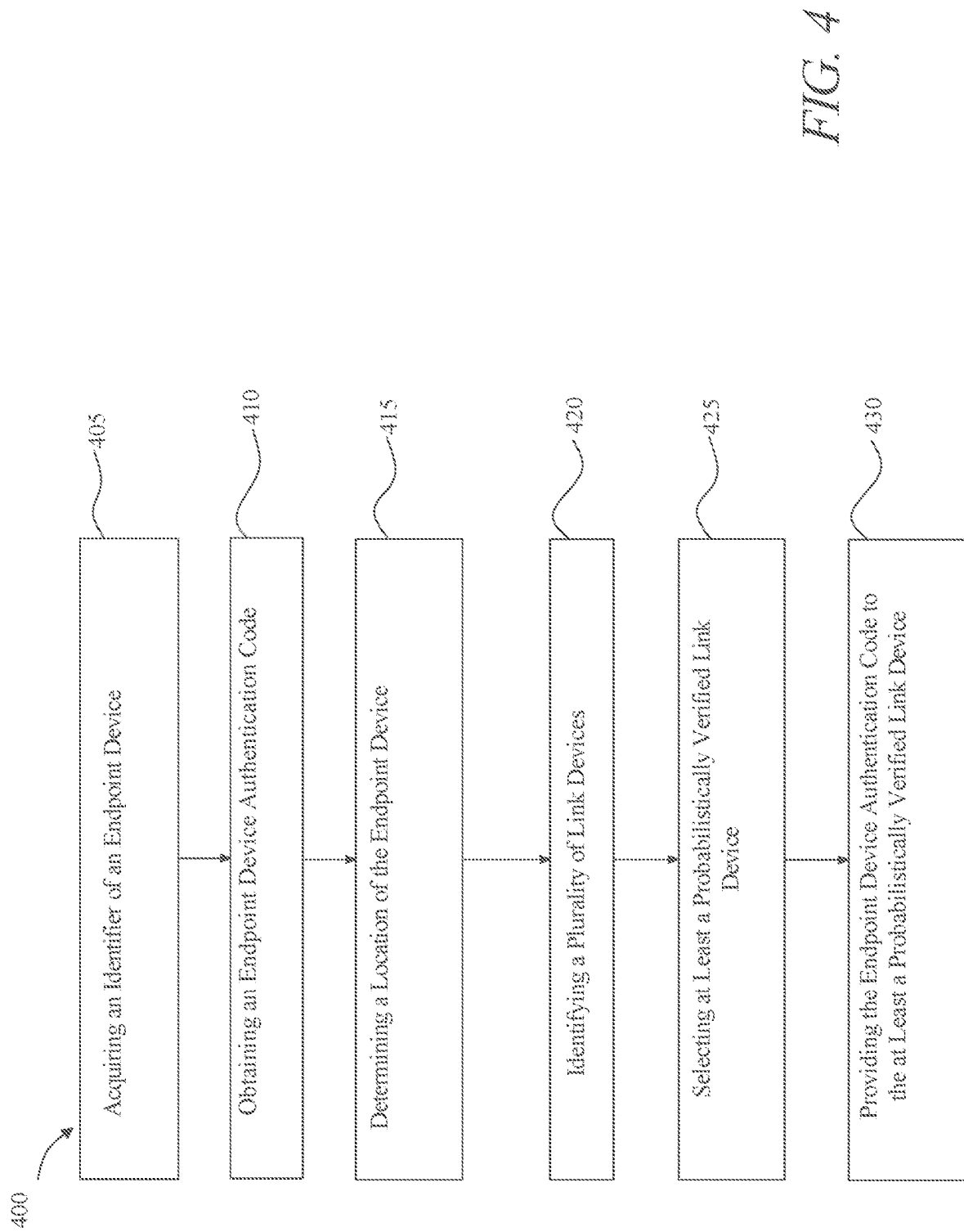
FIG. 4 is a flow diagram illustrating an exemplar embodiment of a method of link device authentication.

Referring now to FIG. 4, an exemplary embodiment of a method 400 of link device 116 authentication is illustrated. At step 405, a computing device 104 acquires an identification of an endpoint device 112 from an originating device 108; this may be implemented, without limitation, as described above in reference to FIGS. 1-3.

At step 410, and continuing to refer to FIG. 4, computing device 104 obtains an endpoint device authentication code 124; this may be implemented, without limitation, as described above in reference to FIGS. 1-3. For instance, and without limitation, obtaining endpoint device authentication code 124 may include acquiring the endpoint device authentication code 124 from the originating device 108. As a further non-limiting example, obtaining endpoint device authentication code 124 may include generating the endpoint device authentication code 124.

At step 415, and still referring to FIG. 4, computing device 104 determines a location of endpoint device 112; this may be implemented, without limitation, as described above in reference to FIGS. 1-3. As a non-limiting example, determining location of endpoint device 112 may include acquiring the location from the endpoint device 112. As an additional example, determining a location of endpoint device 112 may include acquiring communication metadata from the endpoint device 112 and determining the location as a function of the communication metadata.

At step 420, and further referring to FIG. 4, computing device 104 identifies a plurality of link devices 116; this may be implemented, without limitation, as described above in reference to FIGS. 1-3.

At step 425, and still referring to FIG. 4, computing device 104 selects at least a probabilistically verified link device 116 from plurality of link devices 116 as a function of location of endpoint device 112; this may be implemented, without limitation, as described above in reference to FIGS. 1-3. Selecting at least a probabilistically verified link device 116 may include determining a distance from location of endpoint device 112 to a location of the at least a probabilistically verified link device 116 and selecting the at least a probabilistically verified link device 116 as a function of the distance. As a further non-limiting example, selecting at least a probabilistically verified link device 116 may include determining a temporal datum and selecting the at least a probabilistically verified link device 116 as a function of the temporal datum. In another non-limiting example, selecting the at least a probabilistically verified link device 116 may include training a machine-learning model as a function of training data, wherein the training data groups sets of endpoint device 112 data and link device 116 data with verified communications, acquiring current endpoint device 112 data and current link device 116 data, and selecting the at least a probabilistically verified link device 116 as a function of the current endpoint device 112 data, the current link device 116 data, and the machine-learning model.

At step 425, and further referring to FIG. 4, computing device 104 may provide the endpoint device authentication code 124 to the at least a probabilistically verified link device 116; this may be implemented, without limitation, as described above in reference to FIGS. 1-3. Computing device 104 may authenticate originating device 108. Computing device 104 may authenticate endpoint device 112.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
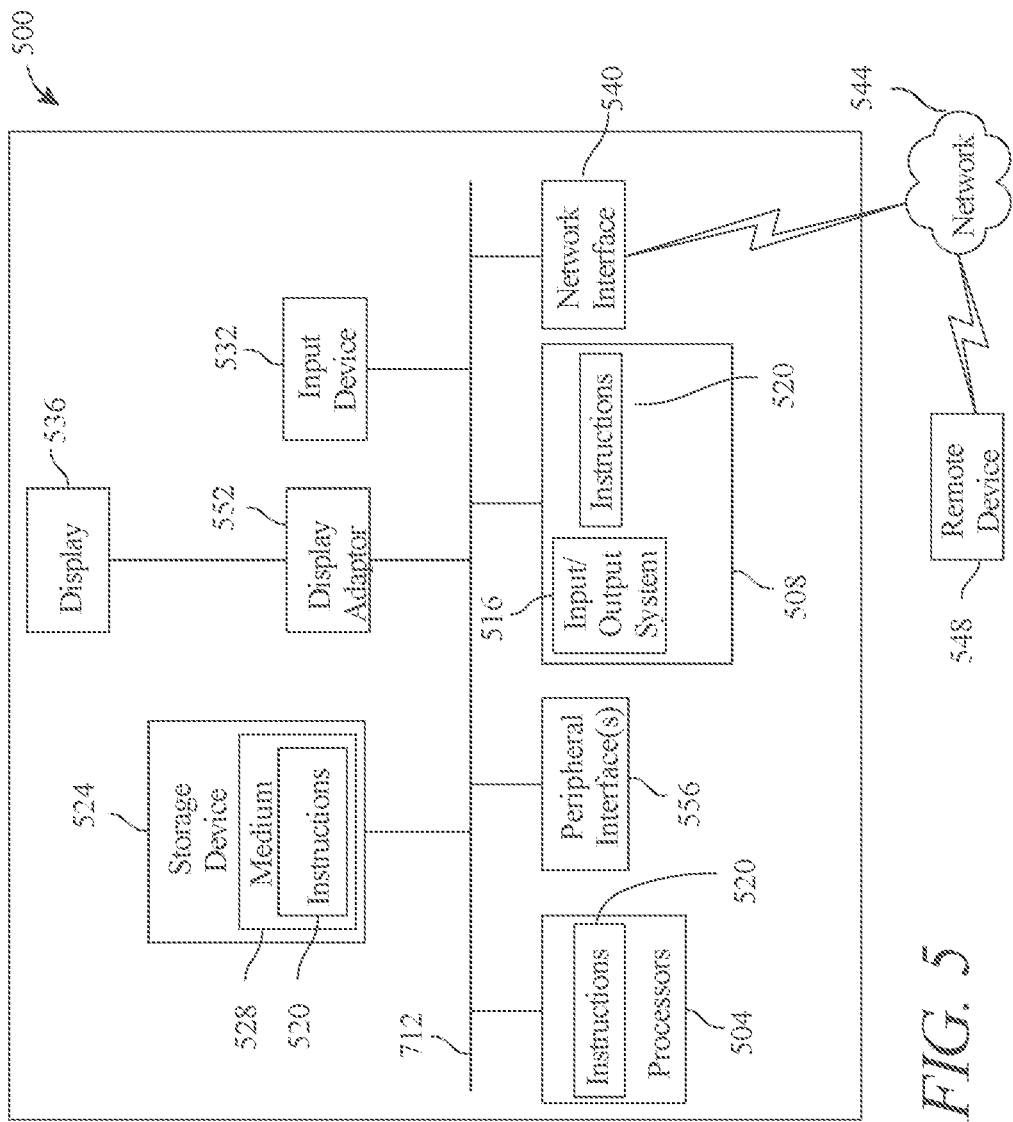
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral 136 bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral 136 output devices including, but not limited to, an audio speaker, a printer, and any combinations thereof. Such peripheral 136 output devices may be connected to bus 512 via a peripheral 136 interface 556. Examples of a peripheral 136 interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for device authentication, comprising a computing device configured to:
   acquire, from an originating device, a biometric identifier associated with a user of an endpoint device;
   obtain an endpoint device biometric key corresponding to the biometric identifier;
   determine, as a function of the biometric identifier, an authenticity of the endpoint device;
   identify a plurality of user devices;
   select, from the plurality of user devices, at least a probabilistically user authorized link device as a function of the authenticity of the endpoint device; and
   transmit, to the endpoint device, the endpoint device biometric key.

2. The system of claim 1, wherein obtaining the endpoint device biometric key further comprises acquiring the endpoint device biometric key from the originating device.

3. The system of claim 1, wherein the biometric identifier of is acquired by a biometric reader.

4. The system of claim 1, wherein the biometric identifier includes a biometric signature of the user.

5. The system of claim 1, wherein the biometric identifier comprises behavioral biometric data.

6. The system of claim 1, wherein the biometric identifier is generated from a biometric sample of a specific user.

7. The system of claim 1, wherein the endpoint device biometric key comprises a hash function.

8. The system of claim 1, wherein the endpoint device is configured to host a remittance transaction for the user.

9. The system of claim 1, wherein the endpoint device biometric key is associated with an authorized user.

10. The system of claim 1, wherein the biometric identifier is acquired through a user input at the endpoint device.

11. A method of device authentication, comprising:
    acquiring, from an originating device, a biometric identifier of an endpoint device;
    obtaining, from a computing device, an endpoint device biometric key corresponding to the biometric identifier;
    determining, as a function of the biometric identifier, an authenticity of the endpoint device;
    identifying a plurality of user devices;
    selecting, from the plurality of user devices, at least a probabilistically user authorized link device as a function of the authenticity of the endpoint device; and
    transmitting, to the endpoint device, the endpoint device biometric key.

12. The method of claim 11, wherein obtaining the endpoint device biometric key further comprises acquiring the endpoint device biometric key from the originating device.

13. The method of claim 11, wherein the biometric identifier is acquired by a biometric reader.

14. The method of claim 11, wherein the biometric identifier includes a biometric signature of the user.

15. The method of claim 11, wherein the biometric identifier comprises behavioral biometric data.

16. The method of claim 11, wherein the biometric identifier is generated from a biometric sample of a specific user.

17. The method of claim 11, wherein the endpoint device biometric key comprises a hash function.

18. The method of claim 11, wherein the endpoint device is configured to host a remittance transaction for the user.

19. The method of claim 11, wherein the endpoint device biometric key is associated with an authorized user.

20. The method of claim 11, wherein the biometric identifier is acquired through a user input at the endpoint device.

* * * * *